Jan. 18, 1927. 1,614,557
R. JONGEDYK
MACHINE PRESS
Filed June 25, 1925 2 Sheets-Sheet 1

Inventor
Ralph Jongedyk
by
Atty.

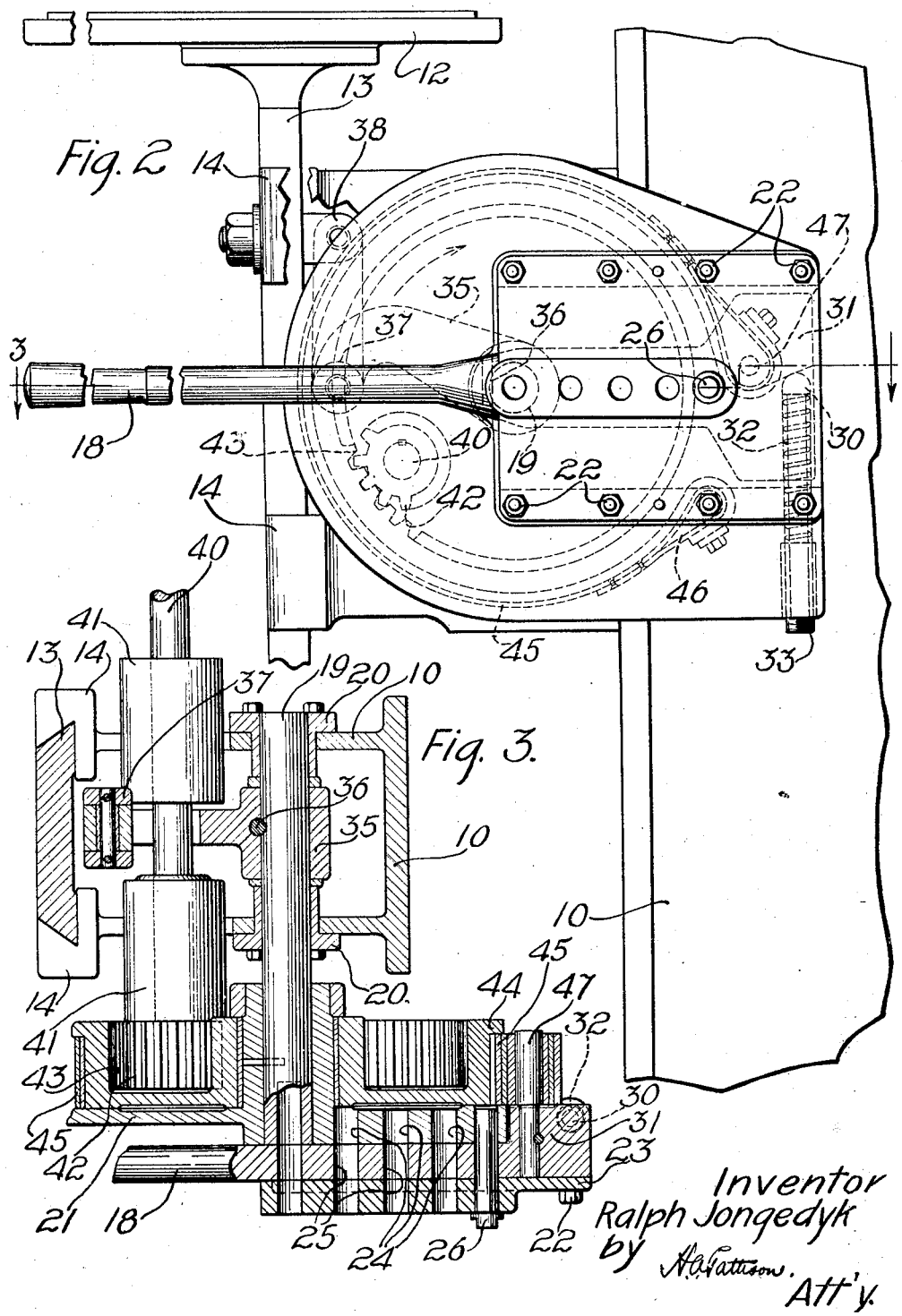

Patented Jan. 18, 1927.

1,614,557

UNITED STATES PATENT OFFICE.

RALPH JONGEDYK, OF CHICAGO, ILLINOIS, ASSIGNOR TO WESTERN ELECTRIC COMPANY, INCORPORATED, OF NEW YORK, N. Y., A CORPORATION OF NEW YORK.

MACHINE PRESS.

Application filed June 25, 1925. Serial No. 39,423.

This invention relates to machine presses, and more particularly to mechanisms for bringing the machine tools operated by such presses in contact with the work.

It is the principal object of the present invention to enable an operator to control the application of power to a machine press for bringing the work in contact with the machine tool and at the same time permit the detection of the behavior of the machine tool.

According to its preferred embodiment, the invention contemplates the provision of a machine press equipped with a work-table which may be raised manually due to the movement of the usual lever provided for this purpose. This lever is operatively associated with a clutch mechanism, which is rendered effective upon the movement of the lever a predetermined distance and when the movement of the machine tool is retarded for communicating power from a source of motive power which aids the operator in elevating the work-table, and also enables the operator to quickly detect the characteristics of the work as indicated by the behavior of the tool in contact therewith.

Other details and features of the invention will become apparent from the following detailed description taken with the accompanying drawings, wherein—

Fig. 2 is a side view of a portion of the same mechanism; and

Fig. 3 is a plan section taken on the line 3—3 of Fig. 2.

Figure 1:
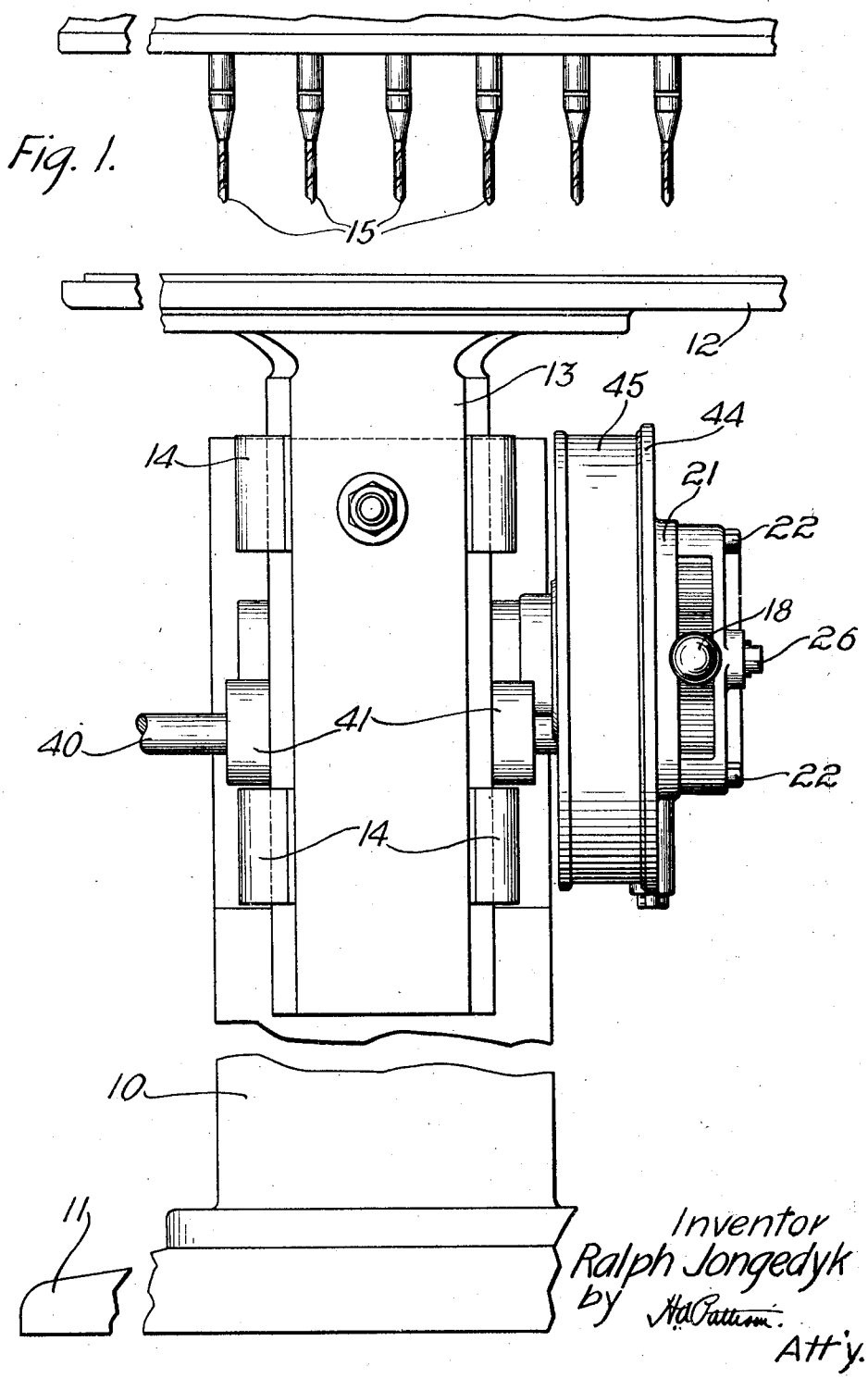
Fig. 1 is a front elevation of a multiple spindle drill press in which one embodiment of the invention is employed to raise the work-table thereof.

Referring now to the accompanying drawings in which like numerals are employed to designate similar members throughout the several views, the numeral 10 refers generally to the main frame of the machine terminating in its lower portion in a base 11 which supports the entire mechanism. A work-table 12 is secured to an apron 13, which is slidable in ears 14 which are a part of the main frame 10, whereby whatever material may be placed upon the work-table 12 may be brought into contact with drills 15 which are mounted and operated in any suitable manner. Further details regarding the drills 15 and the manner in which they are caused to rotate will not be described because the invention does not pertain thereto.

The work-table 12 is raised by the actuation of a lever 18, and the manner in which the lever 18 functions to produce the result described will be understood from a consideration of the following mechanism. A shaft 19 is rotatably journaled in bearings 20, which are suitably secured to the main frame 10, and has keyed thereto a plate 21 to which is secured by bolts 22 a plate-guard 23, a plurality of cylindrical apertures 24, the purpose of which will be described, being provided in the plate 21 and plate-guard 23. A plurality of holes indicated at 25 are also provided in the lever 18, and the apertures in the plate 21 and plate-guard 23 being in line with the holes 25 in the lever 18, a stud 26 may be inserted as shown particularly in Fig. 3 to cause the lever 18 to be pivoted about any one of a plurality of selectable points. A plunger 30 is forced against a shoulder 31 of the lever 18 by a coil spring 32, the plunger 30 and the spring 32 being secured in a suitable aperture in the plate 21 by means of a tension regulating nut 33. The tension of the spring 32 is preferably regulated so that a preliminary raising of the lever 18 will not cause a depression of the plunger 30. This being the case and the lever 18 also being pinned to the plate 21, the entire lever assembly functions as a single lever with a fulcrum on the shaft 19 which is therefore rotated by the raising of the lever 18. A bell-crank arm 35 is keyed at 36 to the shaft 19 and communicates with a link 37 which is suitably secured at 38 to the apron 13 so that a rotation of the shaft 19 will cause, through the two members described, a raising of the apron 13 thus carrying the table 12 to an upward position with it. The table 12 is therefore raised preliminarily without the application of any power, by the operator of the machine, when he raises the lever 18.

Means embodying the invention is provided for applying power to the action of the lever 18 when the drills 15 encounter the work, thus providing an obstacle to the free movement of the parts described in the preceding paragraph. Machine power is applied to aid the operator in raising the lever 18, at the same time allowing the operator to feel the behavior of the drills 15, by the following mechanism. A shaft 40 leading to a source of power (not shown) is journaled in suitable bearings 41 in the main frame 10, and carries integral with it a pinion gear 42 which meshes with an internal gear 43 on a drum 44. A brake band 45 having one end secured at 46 to the plate 21 and the other end secured at 47 to the lever 18 surrounds the drum 44, as shown particularly in Figs. 2 and 3. The direction of rotation of the drum 44 indicated by the arrow in Fig. 2 is the same as the direction which is required for the shaft 19 to turn in order to result in an elevation of the table 12. When the work is encountered by the drills 15, the resistance to the free movement of the parts required to preliminarily elevate the table causes a depression of the plunger 30 against the shoulder 31 thus allowing the lever 18 to pivot around the stud 26 thereby tightening the band 45. This tends to cause the band 45 to rotate with the drum 44, and since the other end of the band is secured at 46 to the plate 21, the motion of the band 46 is imparted to the plate thus tending to cause a rotation of the plate. This results in a power rotation of the shaft 19, thus aiding in the hand rotation thereof so as to elevate the table with greater force than that exerted by the operator.

One of the principal advantages of the invention is that the operator can feel at all times the behavior of the drills 15. This is of great advantage, because when the normal progress of the drill is interfered with or if the operator feels in his hand that the drill is practically through the part which is drilled, he can immediately either raise or lower the lever 18 in accordance with the demands of the condition encountered. If the lever 18 is raised the force exerted is increased in proportion to the pull upward on the lever. When the lever 18 is lowered, pressure of the work against the drills 15 immediately ceases. This is accomplished by the band 45 preliminarily becoming loose upon the drum, thus eliminating the power factor; and further movement allows the plunger 30 to return to its normal position while the entire lever assembly is rotating with the shaft 19 to permit a lowering of the apron 13, thus carrying the table 12 to a lower position.

The relationship of the force applied by the hand to the lever 18 and the power communicated to the shaft 19 can be changed by varying the position of the stud 26 so as to change the fulcrum point of the lever proper. The fulcrum point of the entire lever assembly including the plate 21 is of course always the axis of the shaft 19 independent of the position of the stud 26.

It is believed that the invention is applicable in the embodiment shown and in other forms as well to a large number of machine presses and similar mechanisms in which a machine tool must be given a movement relative to material upon which it is to perform work, and the invention is therefore not to be limited by the specific structure shown in the accompanying drawings and described above, but is to be limited only by the scope of the appended claims.

I claim:

1. In a machine press, a work-table, means for mounting tools with which to perform work upon material on the work-table, means manually controlled for changing the relative position of the work-table and the mounting means, a source of motive power, and means for communicating power from said source of motive power in proportion to the force exerted on the manually controlled means to aid the manually controlled means in changing the relative position of the work-table and the mounting means.

2. In a machine press, a work-table, means for mounting tools with which to perform work upon material on the work-table, manual means for causing a relative movement between the tools and the work-table, and mechanically operable means rendered effective and controlled by the manual means for causing a further movement between the tools and the work-table.

3. In a machine press, a work-table, manually operable means for elevating the work-table, a source of motive power, and means for communicating power from said source of motive power to assist the first mentioned means in elevating the work-table in proportion to the manual power exerted on the first mentioned means.

4. In a machine press, a work-table, a manually operable lever communicating with the work-table for raising the same, and a friction clutch associated with the lever for transmitting power to the lever to aid the lever in raising the work-table, the power transmitted being in proportion to the manual force applied thereto.

5. In a machine press, a work-table, a lever associated with the work-table for raising the same, a power driven drum, and a brake band around the drum having one end secured to the lever, the movement of the lever in raising the work-table also functioning to tighten the band around the drum, so that rotation of the drum aids in the raising of the lever.

6. In a machine press, a work-table, a lever associated with the work-table for raising the same, a power driven drum, a brake band around the drum having one end secured to the lever, means effective upon the movement of the lever to tighten the band around the drum so that rotation of the drum will aid in the raising of the lever, and means for preventing the tightening of the band until a predetermined resistance to the free raising of the work-table is encountered.

7. In a machine press, a work-table, a lever associated with the work-table for raising the same, a power driven drum, a brake band around the drum having one end secured to the lever, means operated by a proportion of the force applied to the lever for tightening the band around the drum so that rotation of the drum will aid the lever in the raising of the work-table, and means permitting a variation in the proportion of the force applied to the lever, which will be effective in tightening the band.

In witness whereof, I hereunto subscribe my name this 13th day of June, A. D. 1925.

RALPH JONGEDYK.